United States Patent
Kojima

(10) Patent No.: US 8,417,293 B2
(45) Date of Patent: Apr. 9, 2013

(54) ELECTRONIC DEVICE, METHOD OF CONTROLLING THE SAME, AND PROGRAM

(75) Inventor: Nobuhisa Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/690,014

(22) Filed: Jan. 19, 2010

(65) Prior Publication Data

US 2010/0197348 A1 Aug. 5, 2010

(30) Foreign Application Priority Data

Feb. 3, 2009 (JP) ................................. 2009-022961

(51) Int. Cl.
*H07Q 7/20* (2011.01)
(52) U.S. Cl. ...................... 455/558; 455/557; 455/550.1; 455/412.1; 455/575.1; 455/445; 348/231.6; 348/207.1; 348/14.01; 348/14.02; 348/14.13
(58) Field of Classification Search ............... 348/231.6, 348/207.1, 14.01, 14.02, 14.13; 455/558, 455/557, 550.1, 412.1, 412.2, 575.1, 90.3, 455/445, 426.1, 426.2
See application file for complete search history.

(56) References Cited

U.S. PATENT DOCUMENTS

| | | | | |
|---|---|---|---|---|
| 6,816,190 B1* | 11/2004 | Miyazawa | ................ | 348/231.6 |
| 7,339,610 B2* | 3/2008 | Kusaka | ...................... | 348/207.1 |
| 2004/0196375 A1* | 10/2004 | Marshall | .................... | 348/207.1 |

FOREIGN PATENT DOCUMENTS

JP 2004357182 A 12/2004

* cited by examiner

*Primary Examiner* — Keith Ferguson
(74) *Attorney, Agent, or Firm* — Fitzpatrick, Cella, Harper & Scinto

(57) ABSTRACT

An electronic device that is accessible to a first storage medium that has no communication function and a second storage medium that has a communication function and is detachable to the device, including: an input unit configured to input image data; a designation unit configured to designate at least one of the first storage medium and the second storage medium as a storage medium serving as a storage destination of the image data input by the input unit; and a control unit configured to, if the first storage medium is designated as the storage destination of the image data and the second storage medium is not designated, store the image data in the first storage medium and store the image data in the second storage medium as well so as to transmit the image data to an external apparatus by the communication function of the second storage medium.

12 Claims, 7 Drawing Sheets

ELECTRONIC DEVICE, METHOD OF CONTROLLING THE SAME, AND PROGRAM

BACKGROUND OF THE INVENTION

1. Field of the Invention

The present invention relates to an electronic device accessible to a plurality of storage media.

2. Description of the Related Art

In recent years, various kinds of storage media have been standardized and manufactured for sale. Especially, compact portable storage media known as flash memory cards have many standards and are used as external storage media (memory cards) for digital cameras and portable music players.

As the number of digital cameras which feature a higher-resolution image sensing element or a moving image capturing function grows, the amount of captured data is increasing. Hence, a large-capacity storage medium is demanded.

To cope with the increasing data amount, a wireless communication function is imparted to a digital camera to transmit captured data to an external apparatus.

To transmit data, the wireless communication function may be imparted to a so-called memory card (e.g., Japanese Patent Laid-Open No. 2004-357182). As the wireless communication function, for example, a wireless communication scheme such as 802.11b, 802.11a, or 802.11g planned by the IEEE802.11 working group is used.

However, Japanese Patent Laid-Open No. 2004-357182 does not consider a device capable of including a plurality of storage media.

For example, a camera having a plurality of memory card slots allows inserting a memory card with a wireless communication function into one memory card slot and another memory card without the wireless communication function into another card slot.

In this case, data stored in the memory card having the wireless communication function can be transmitted externally. However, data stored in the memory card having no wireless communication function cannot directly be transmitted to the outside. To externally transmit it, the data stored in the memory card having no wireless communication function need to be temporarily copied to the memory card having the wireless communication function. This operation is cumbersome for the user.

SUMMARY OF THE INVENTION

The present invention has been made in consideration of the above-described problem, and realizes a technique for allowing an electronic device accessible to a plurality of storage media including a storage medium having a wireless communication function to transmit data externally without any cumbersome operation.

In order to solve the aforementioned problems, the present invention provides an electronic device that is accessible to a first storage medium that has no communication function and a second storage medium that has a communication function and is detachable to the device, comprising: an input unit configured to input image data; a designation unit configured to designate at least one of the first storage medium and the second storage medium as a storage medium serving as a storage destination of the image data input by the input unit; and a control unit configured to, if the first storage medium is designated as the storage destination of the image data and also the second storage medium is not designated, store the image data in the first storage medium and store the image data in the second storage medium as well so as to transmit the image data to an external apparatus by the communication function of the second storage medium.

The present invention also provides a control method of an electronic device that is accessible to a first storage medium that has no communication function and a second storage medium that has a communication function and is detachable to the device, comprising the steps of: inputting image data; designating one of the first storage medium and the second storage medium as a storage medium serving as a storage destination of the image data input in the inputting step; and if the first storage medium is designated as the storage destination of the image data and the second storage medium is not designated, storing the image data in the first storage medium and storing the image data in the second storage medium as well so as to transmit the image data to an external apparatus by the communication function of the second storage medium.

According to the present invention, it is possible to allow a device accessible to a plurality of storage media including a storage medium having a wireless communication function to transmit data externally without any cumbersome operation.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments. A plurality of embodiments to be described below can also be combined as needed.

An electronic device according to the present invention will now be described in detail based on the embodiment. The dimensions, materials, forms, and relative layouts of the constituent components described in the embodiment are not intended to limit the scope of the invention unless it is specifically stated otherwise, but are merely explanatory examples.

First Embodiment

Figure 1:
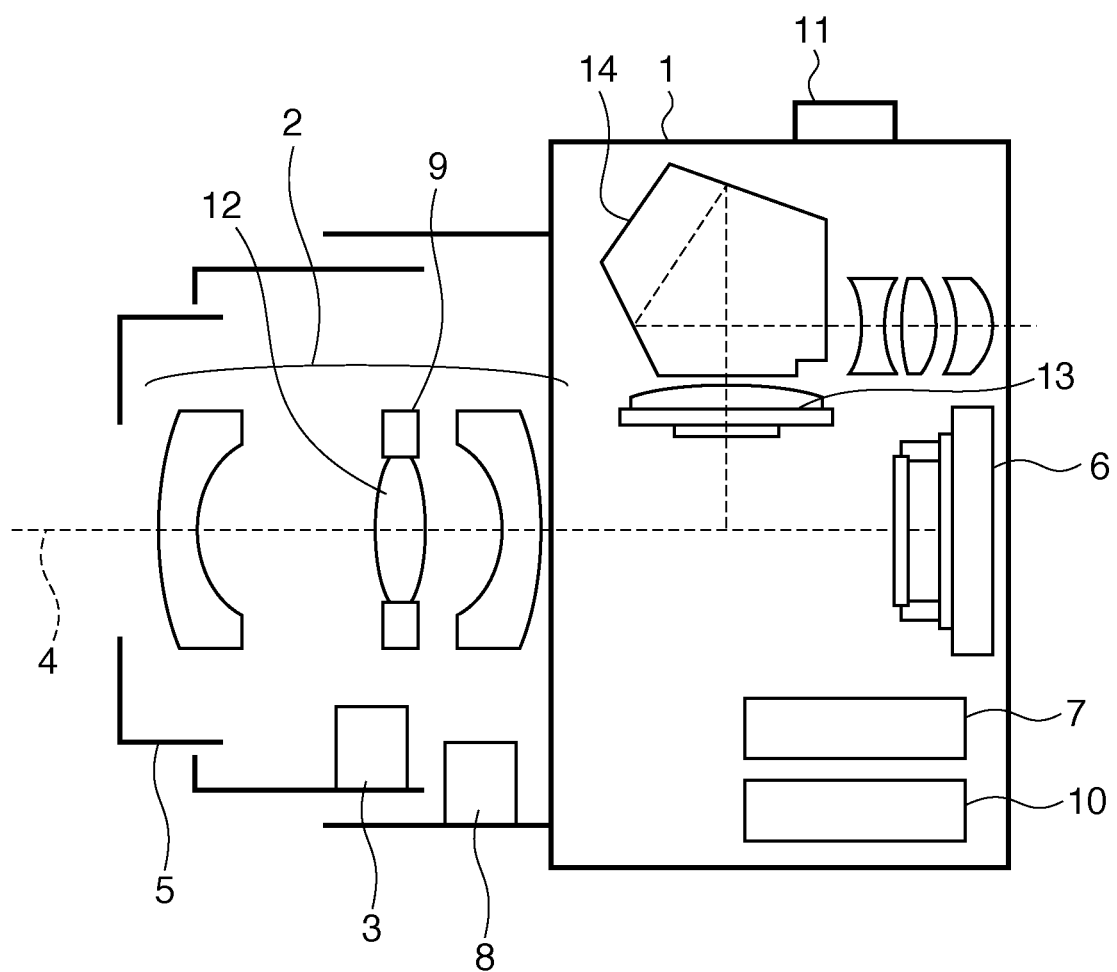
FIG. 1 is a view showing the hardware configuration of a digital camera according to the first embodiment of the present invention.

FIG. 1 is a view showing the hardware configuration of an electronic device according to the first embodiment of the present invention.

Referring to FIG. 1, the electronic device of the first embodiment is a digital camera (to be referred to as a camera hereinafter) 1. Reference numeral 2 denotes a photographing optical system; 3, a lens driving unit; 4, an optical axis of the photographing optical system 2; 5, a lens barrel; 6, an image sensing element; 7, a memory unit; and 8, a camera shake detection unit. Reference numeral 9 denotes a camera shake lens driving unit; 10, a power supply; 11, a release button; 12, a correction optical system; 13, a quick return mirror; and 14, a finder optical system.

As shown in FIG. 1, the camera 1 forms an object image near the image sensing element 6 using the photographing optical system 2 and a focus adjusting unit (not shown). The image sensing element 6 photoelectrically converts the object image to generate image data based on the input object image. The information of the object is obtained from the image sensing element 6 and stored in the memory unit 7 in synchronism with the user operation on the release button 11. For example, a semiconductor memory serves as the memory unit 7. The memory unit 7 includes a plurality of memory cards and an internal memory, as will be described later in detail.

If a camera shake has occurred during exposure or the like, the camera shake lens driving unit 9 is operated based on the detection result of the camera shake detection unit 8. As a result, the image blur on the imaging plane of the image sensing element 6 is reduced to correct image degradation caused by the camera shake. In a continuous shooting mode, image data are temporarily stored in a buffer memory (not shown) and then stored in the memory unit 7 after the end of continuous shooting. After the storage in the memory unit 7, the buffer memory is released. Note that the camera 1 operates by receiving power from the power supply 10.

Figure 2:
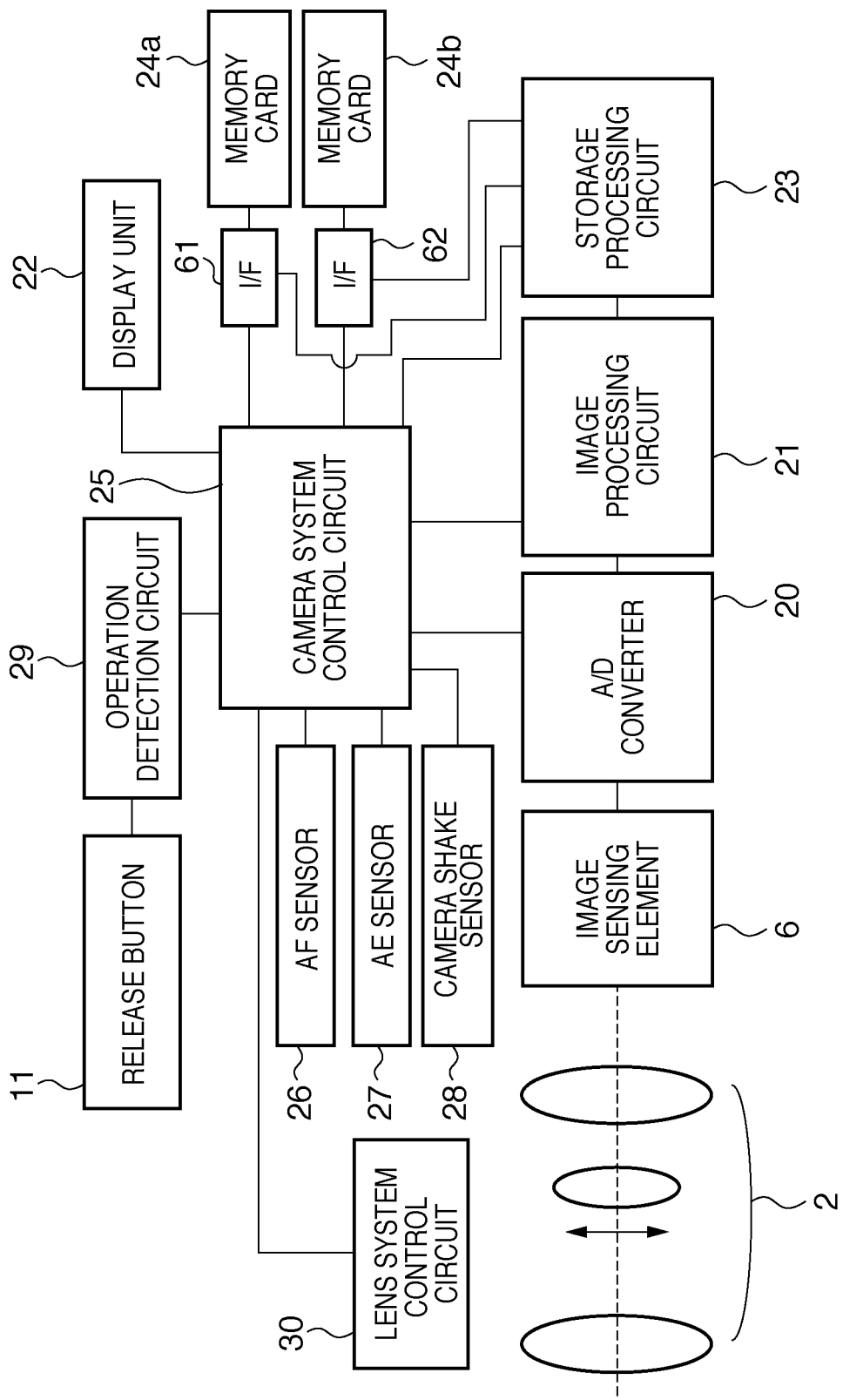
FIG. 2 is a block diagram showing the electrical arrangement of the digital camera according to the first embodiment of the present invention.

FIG. 2 is a block diagram showing the electrical arrangement of the camera according to the first embodiment.

Referring to FIG. 2, the camera 1 includes an image sensing system, image processing system, storage/reproduction system, and control system. The image sensing system includes the photographing optical system 2 and the image sensing element 6. The image processing system includes an A/D converter 20 and an image processing circuit 21. The storage/reproduction system includes a display unit 22, storage processing circuit 23, and memory card 24. The control system includes a camera system control circuit 25, AF sensor 26, AE sensor 27, camera shake sensor 28, operation detection circuit 29, and lens system control circuit 30.

The image sensing system is an optical processing system which forms an image of light from an object onto the imaging plane of the image sensing element 6 via the photographing optical system 2. Based on the signal from the AE sensor 27, the image sensing element 6 is exposed to object light having an appropriate light amount using a stop (not shown) or the like.

The image processing circuit 21 is a signal processing circuit which processes an image signal received from the image sensing element 6 via the A/D converter 20 and corresponding to the number of pixels of the image sensing element 6. The image processing circuit 21 includes a white balance circuit, a gamma correction circuit, and an interpolation calculation circuit for raising the resolution by interpolation calculation.

The storage processing circuit 23 outputs the image signal to memory cards 24a and 24b via I/Fs 61 and 62, respectively. The storage processing circuit 23 also generates and stores display data to be output to the display unit 22. The storage processing circuit 23 also compresses an image or a moving image using a predetermined method.

The memory cards 24a and 24b are detachable to the camera 1 via the I/Fs 61 and 62. The memory cards attached to the camera 1 are accessible from it. When image sensing processing is executed, an image file obtained by the image sensing processing is stored in a memory card set as the storage destination.

Note that based on a user operation detected by the operation detection circuit 29, the camera 1 can set a memory card as the storage destination.

In addition, based on a user operation detected by the operation detection circuit 29, the camera 1 can set whether to transmit image data obtained by image sensing processing to an external apparatus using a wireless communication function to be described later.

The control system controls the image sensing system, image processing system, and storage/reproduction system in response to an external operation. For example, upon detecting press of the release button 11, the control system controls driving of the image sensing element 6, the operation of the image processing circuit 21, and compression processing of the storage processing circuit 23. The control system also controls each segment of an information display device which causes the display unit 22 to display information on the optical viewfinder, a liquid crystal monitor, or the like. The camera system control circuit 25 generates and outputs, e.g., a timing signal upon image sensing. The AF sensor 26 and the AE sensor 27 are connected to the camera system control circuit 25. The camera system control circuit 25 appropriately controls the lens, stop plate, and the like based on signals from these sensors. The camera shake sensor 28 is also connected to the camera system control circuit 25. In a camera shake correction mode, the camera system control circuit 25 drives a camera shake correction unit (not shown) based on the signal from the camera shake sensor 28.

Figure 7:
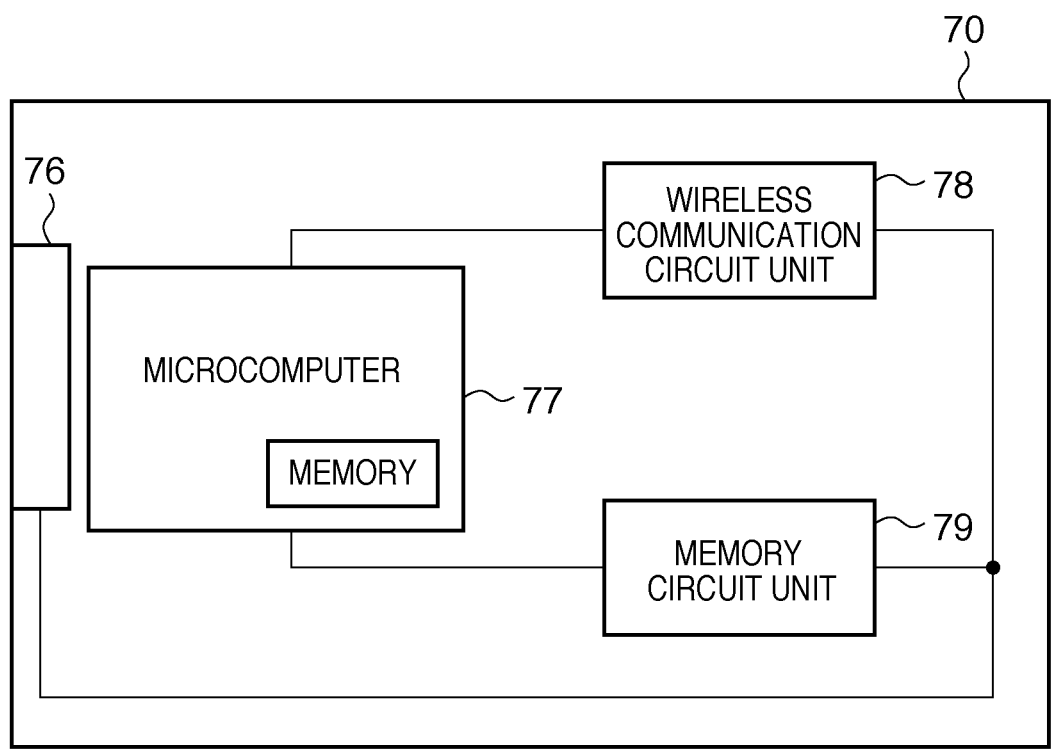
FIG. 7 is a block diagram showing the hardware configuration of a communication memory card according to the first embodiment of the present invention.

A memory card having a wireless communication function will be explained here with reference to FIG. 7. A memory card 70 having a connection wireless communication function includes, as constituent elements, a connector 76, microcomputer 77, wireless communication circuit unit 78, and memory circuit unit 79.

The connector 76 is a connection interface which connects the memory card 70 to the camera 1 or another information processing apparatus to transfer data. The connector 76 connects the memory card 70 and the camera 1 mechanically and electrically.

When the connector 76 connects the memory card 70 to the camera 1, the memory card 70 receives power supplied from the camera 1 via a power supply line. After initialized by a reset circuit (not shown), the memory card 70 starts operating and communicates with the camera 1 via a bus line. The wireless communication circuit unit 78 has a function of wirelessly transmitting data to an electronic device or another information processing apparatus having the same wireless communication function. That is, the wireless communication circuit unit 78 transmits/receives data to/from another electronic device. The wireless communication circuit unit 78 executes wireless communication via, e.g., a wireless LAN using a radio wave. The wireless communication may be done using infrared rays.

The memory circuit unit 79 includes a rewritable nonvolatile memory device such as an EEPROM or a flash EEPROM. The memory circuit unit 79 has a function of storing data supplied from the electronic device connected via the connector 76.

The microcomputer 77 incorporates a memory and has a function of controlling communication with an electronic device connected via the connector 76 and controlling the wireless communication circuit unit 78 and the memory circuit unit 79 in accordance with a control procedure stored in the memory in advance.

Note that the hardware configurations of the camera 1 and the memory card 70 are not limited to those described above. Especially, control of the device may be executed by hardware such as a single processor or by causing a plurality of hardware modules to share processes.

Figure 3:
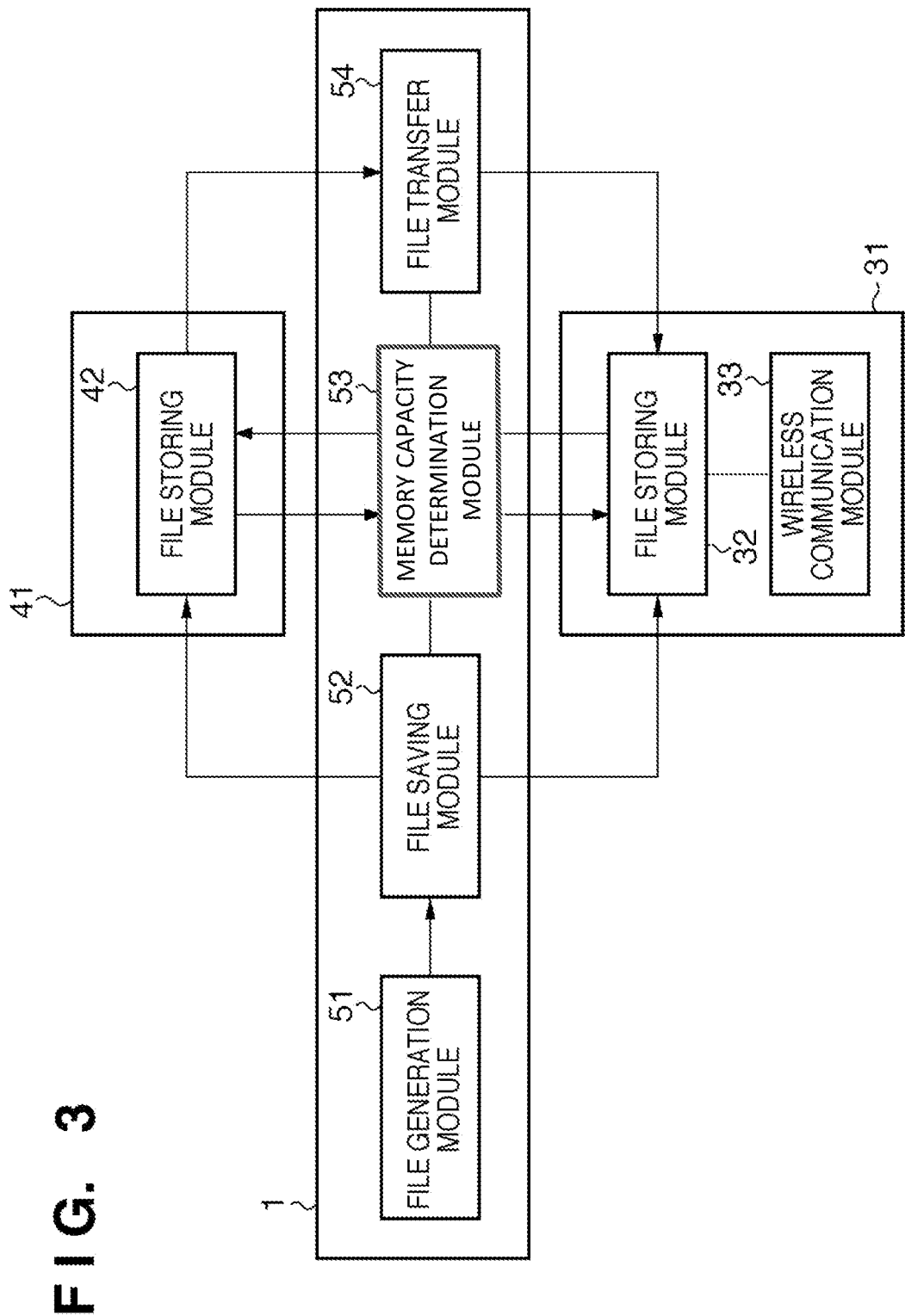
FIG. 3 is a block diagram showing a module configuration according to the first embodiment of the present invention.

FIG. 3 is a block diagram showing a module configuration according to the first embodiment. Note that in the following description, the control unit (e.g., the camera system control circuit 25 or the microcomputer 77) of the camera 1 or the memory card 70 controls the units of the device, thereby implementing the functions of the modules.

Referring to FIG. 3, memory cards 31 and 41 are connectable to the camera 1. The memory cards 31 and 41 correspond to the memory cards 24a and 24b in FIG. 2, respectively. In this embodiment, the memory card 31 is a card having a wireless communication function (to be referred to as a "communication memory card" hereinafter). The memory card 41 is a card having no wireless communication function (to be referred to as a "normal memory card" hereinafter). The memory card 31 is an example of a second storage medium, and the memory card 41 is an example of a first storage medium. The memory card 31 can communicate with an external apparatus via a wireless communication module 33. Examples of the external apparatus are a file server and a personal computer.

Note that the memory card 41 is of a high-speed storage type or a large capacity type and is often less expensive than the memory card 31 because of the absence of the wireless communication function.

Processing when the camera 1 has executed image sensing processing will be described here. Assume that the memory cards 31 and 41 are attached to the camera 1, as shown in FIG. 3. When capturing is performed in this state, a file generation module 51 of the camera 1 creates an image file containing captured data. A file saving module 52 transfers the data to a file storing module 32 or 42 of the memory card designated as the storage destination. The file storing module 32 or 42 stores the data in the memory card 31 or 41.

A case will be explained here in which the image file storage destination is the memory card 31. The image file created by the file generation module 51 of the camera 1 is stored in the memory card 31. The wireless communication module 33 of the memory card 31 automatically transmits the stored image file to an external apparatus. More specifically, the wireless communication module 33 monitors data write in the memory card 31, and upon detecting the write of new data, transmits the data to the external apparatus.

A case will be explained next in which the file storage destination is the memory card 41. The image file created by the file generation module 51 of the camera 1 is stored in the memory card 41. In this case, even when the user wants to transmit the image file stored in the memory card 41 to the external apparatus, the image file cannot be transmitted to the external apparatus because the memory card 41 has no wireless communication function.

In this embodiment, if setting has been done to transmit an image file obtained upon capturing to the external apparatus, the file transfer module 54 copies the image file stored in the memory card 41 to the memory card 31. As a result of copy, the wireless communication module 33 recognizes the write of new data in the memory card 31 and transmits the image file copied from the memory card 41 to the external apparatus.

Note that the camera 1 may set in advance based on a user operation whether to automatically transmit all captured image files, cause the user to decide transmission permission/prohibition every time an image is captured, or cause the user to decide files to be transmitted after capturing a plurality of images.

A memory capacity determination module 53 determines whether the remaining capacity of the memory card 31 is equal to or smaller than a threshold, thereby determining whether image file copy from the memory card 41 to the memory card 31 is possible. If the remaining capacity of the memory card 31 is equal to or smaller than the threshold, the camera 1 warns the user by, e.g., blinking an LED (not shown) or making a buzzer sound. The threshold depends on a predetermined condition. For example, if setting has been done to copy an image file to the file storing module 32 of the memory card 31 every time an image is captured, the data amount of one image file is used as the threshold. If setting has been done to copy image files to the memory card 31 after a plurality of images are captured, the total data amount of the image files to be transmitted is used as the threshold. The threshold may be an arbitrary value. The threshold may be decided based on the remaining capacity of the memory card 31 or the size of image files to be copied from the memory card 41.

If the memory capacity determination module 53 has determined that the remaining capacity of the memory card 31 is equal to or smaller than the threshold and also smaller than the data amount of the image files to be transmitted from the memory card 41, the camera warns the user by, e.g., blinking an LED (not shown) or making a buzzer sound. This makes it possible to notify the user in advance that the image files stored in the memory card 41 cannot be copied to the memory card 31, and image file transmission is impossible consequently.

The functions of the modules according to the embodiment have been described above. The procedure of processing to be executed by the camera 1 according to the embodiment will be explained next.

Figure 4:
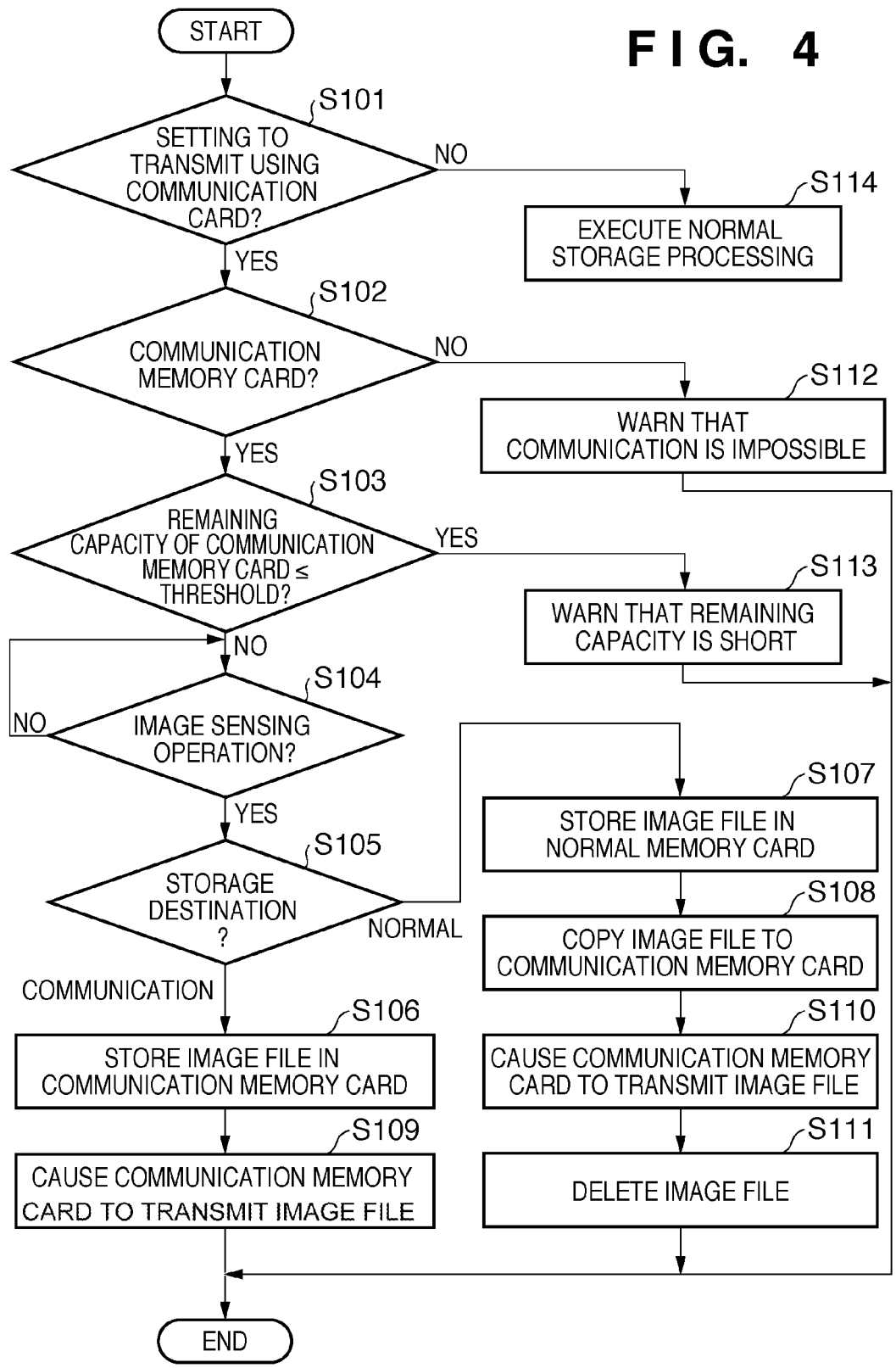
FIG. 4 is a flowchart illustrating processing according to the first embodiment of the present invention.

FIG. 4 is a flowchart illustrating processing to be executed by the camera 1 according to the embodiment. Note that the memory card 41 serving as a normal card and the memory card 31 serving as a communication card are attached to the camera 1, and the storage destination has been set by a user operation. Steps S109 and S110 are processes to be executed by the communication memory card, although they are illustrated in the single flowchart for the descriptive convenience.

First, the camera 1 determines whether setting has been done to transmit an image file using a communication memory card (S101). Upon determining that the setting has been done, the process advances to step S102. Upon determining that the setting has not been done, the process advances to step S114 to execute normal storage processing for a set storage destination.

Next, the camera 1 determines whether a communication memory card has been attached to itself (S102). More specifically, the determination is done by inquiring of an attached memory card about its type. Upon determining that a communication memory card has been attached, the process advances to step S103. Upon determining that no communication memory card has been attached, the camera displays, on the display unit 22 or the like, a warning representing that image file transmission using the wireless communication function is impossible (S112) and ends the processing.

The camera 1 then determines whether the remaining capacity of the communication memory card is equal to or smaller than the threshold (S103). As described above, this processing is executed to determine whether image file copy to the communication memory card is possible. Upon determining that the remaining capacity is not equal to or smaller than the threshold, i.e., the remaining capacity is larger than the threshold, the process advances to step S104. Upon determining that the remaining capacity is equal to or smaller than the threshold, the process advances to step S113 to display, on the display unit 22 or the like, a warning representing that no sufficient capacity remains in the communication memory card, and the processing ends.

The warning in step S113 is displayed even if the image file storage destination has been set to the normal memory card. As described above, when transmitting an image file, even an image file stored in the normal memory card is copied to the communication memory card. Hence, even when the image file storage destination has been set to the normal memory card, image file transmission is impossible if the communication memory card has no free area. In this embodiment, even if the image file storage destination has been set to the normal memory card, the warning is done unless the communication memory card has a sufficient remaining capacity.

The camera 1 determines whether an image sensing operation has been performed (S104). Upon determining that the operation has been performed, the process advances to step S105. Upon determining that the operation has not been performed, the process is repeated.

The camera 1 then determines the currently set storage destination (S105). Upon determining that the storage destination is the communication memory card, the process advances to step S106. Upon determining that the storage destination is the normal memory card, the process advances to step S107.

A case will be described in which the storage destination has been determined to be the communication memory card. In this case, the camera 1 stores an image file obtained by image sensing processing in the communication memory card (S106).

Next, the camera determines whether an external apparatus capable of communicating with the communication memory card exists. If a communicable external apparatus exists, the image file stored in the communication memory card is transmitted to the external apparatus (S109). This determination is done by, e.g., transmitting a query signal to the external apparatus and checking the presence/absence of a response.

A case will be described in which the normal memory card has been set as the image file storage destination. In this case, the camera 1 stores an image file obtained by image sensing processing in the normal memory card (S107).

Next, the camera 1 copies the image file stored in the normal memory card to the communication memory card via the file transfer module 54 (S108). At this time, the image file temporarily stored in the normal memory card is copied. Alternatively, the image file may temporarily be stored in a temporary storage device such as a RAM incorporated in the camera 1. Then, the image file may be read out from the RAM and copied to the communication memory card.

When the copy processing in step S108 has been executed, the communication memory card detects the new image file and transmits it to the external apparatus (S110).

Upon receiving a transmission completion notification from the communication memory card, the camera 1 deletes the image file copied in step S108 from the communication memory card (S111) and ends the processing.

The processes in steps S109 to S111 will be described here. The transmission processing in step S109 is executed when the storage destination is the communication memory card. In this case, the user wants to transmit the image file and simultaneously keep it stored in the communication memory card at a high probability. Hence, the transmitted image file is not automatically deleted from the communication memory card.

Conversely, the transmission processing in step S110 is executed when the storage destination is the normal memory card, and the image file has been copied to the communication memory card. In this case, the user wants to transmit the image file and simultaneously keep it stored in the normal memory card at a high probability. That is, since the image file is already stored in the normal memory card, the image file coped to the communication memory card becomes unnecessary after transmission at a high probability. Hence, the transmitted image file is automatically deleted from the communication memory card in step S111.

Note that upon detecting power off during image file transmission, the camera 1 interrupts transmission. However, if the point of time of transmission interrupt and the connection relationship to the memory card 31 do not change, the transmission may be resumed by turning on the power switch.

If the battery cover is opened during image file transmission, the camera interrupts transmission. However, if the point of time of transmission interrupt and the connection relationship to the memory card 31 do not change, the transmission may be resumed by closing the battery cover.

If a capturing or pre-capturing instruction is input via, e.g., the release button 11 during image file transmission, the camera 1 interrupts copy of the file that is being transmitted while giving priority to capturing. This enables capturing without missing the shutter chance.

As described above, in the first embodiment, an image file stored in the memory card 41 having no wireless communication function is copied to the memory card 31 having the wireless communication function, thereby allowing image file transmission to a communicable external apparatus. Note that in the embodiment, the camera 1 automatically executes the operation in step S104 to S111. Hence, the user can automatically transmit image files stored in the normal memory card to the external apparatus only by instructing the camera 1 to perform image sensing. That is, the user need not perform the cumbersome operation of copying the image files from the normal memory card to the communication memory card.

Note that in this embodiment, a camera having two memory card slots has been exemplified. However, the same effect as described above can be obtained even in the camera 1 which incorporates a memory corresponding to one of the memory cards. For the combination of an internal memory and a communication memory card, even when the storage destination is the internal memory, the communication memory card can transmit an image file. The internal memory is expected to have a higher storage speed and therefore contributes to an increase in the number of images to be shot continuously, as compared to the camera using two memory cards.

Second Embodiment

The second embodiment will be described next. This embodiment is different from the first embodiment in that a camera 1 has an internal memory in addition to the arrangements shown in FIGS. 1 and 2. Note that the first and second embodiments have many common parts. Hence, a description of parts common to those of the first embodiment will be omitted, and processes unique to the second embodiment will mainly be explained.

In this embodiment, processing to be executed when the remaining capacity of a memory card 31 is smaller than the data amount of an image file to be copied from a memory card 41 in the above-described camera 1 will be described.

Figure 5:
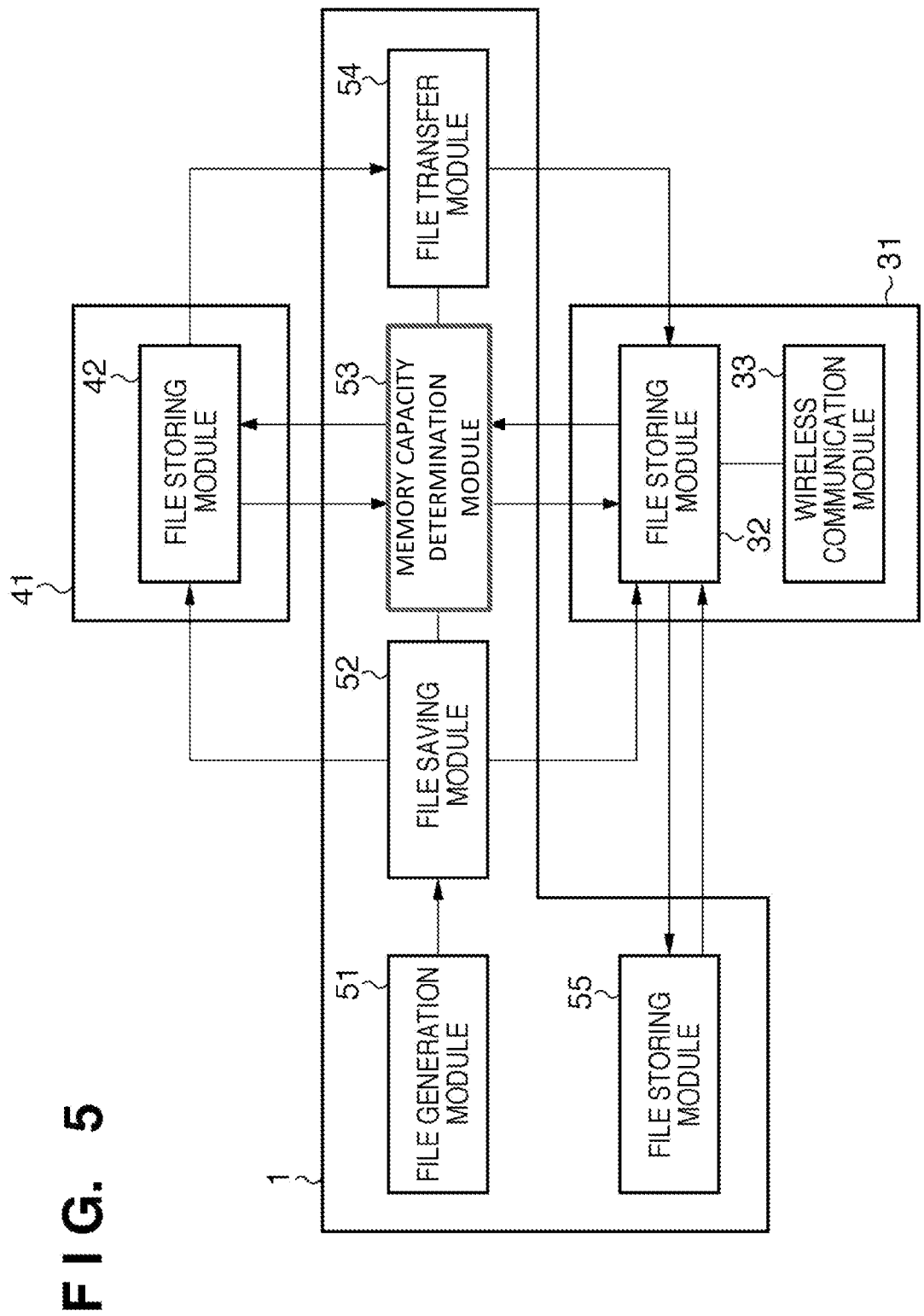
FIG. 5 is a block diagram showing a module configuration according to the second embodiment of the present invention.

FIG. 5 is a block diagram showing the module configuration of a system according to the second embodiment. The same reference numerals as in FIG. 3 denote the same parts in FIG. 5.

As shown in FIG. 5, the camera 1 includes a file storing module 55 configured to store an image file in the internal memory, unlike the arrangement shown in FIG. 3.

Referring to FIG. 5, a case will be explained in which capturing is performed while setting the storage destination to the memory card 41. If a memory capacity determination module 53 has determined that the remaining capacity of the memory card 31 is equal to or smaller than a threshold, a file transfer module 54 cannot execute image file copy.

In this case, the file storing module 55 moves an image file already stored in the memory card 31 to the internal memory. This allows to temporarily generate a free area in the memory card 31 and copy the image file from the memory card 41.

After a wireless communication module 33 of the memory card 31 has transmitted the image file copied from the memory card 41 to an external apparatus, the transmitted image file is deleted from the memory card 31. Then, the image file moved to the internal memory is returned to the memory card 31. This makes it possible to transmit an image file obtained by image sensing without losing any image file already stored in the memory card 31.

Figure 6:
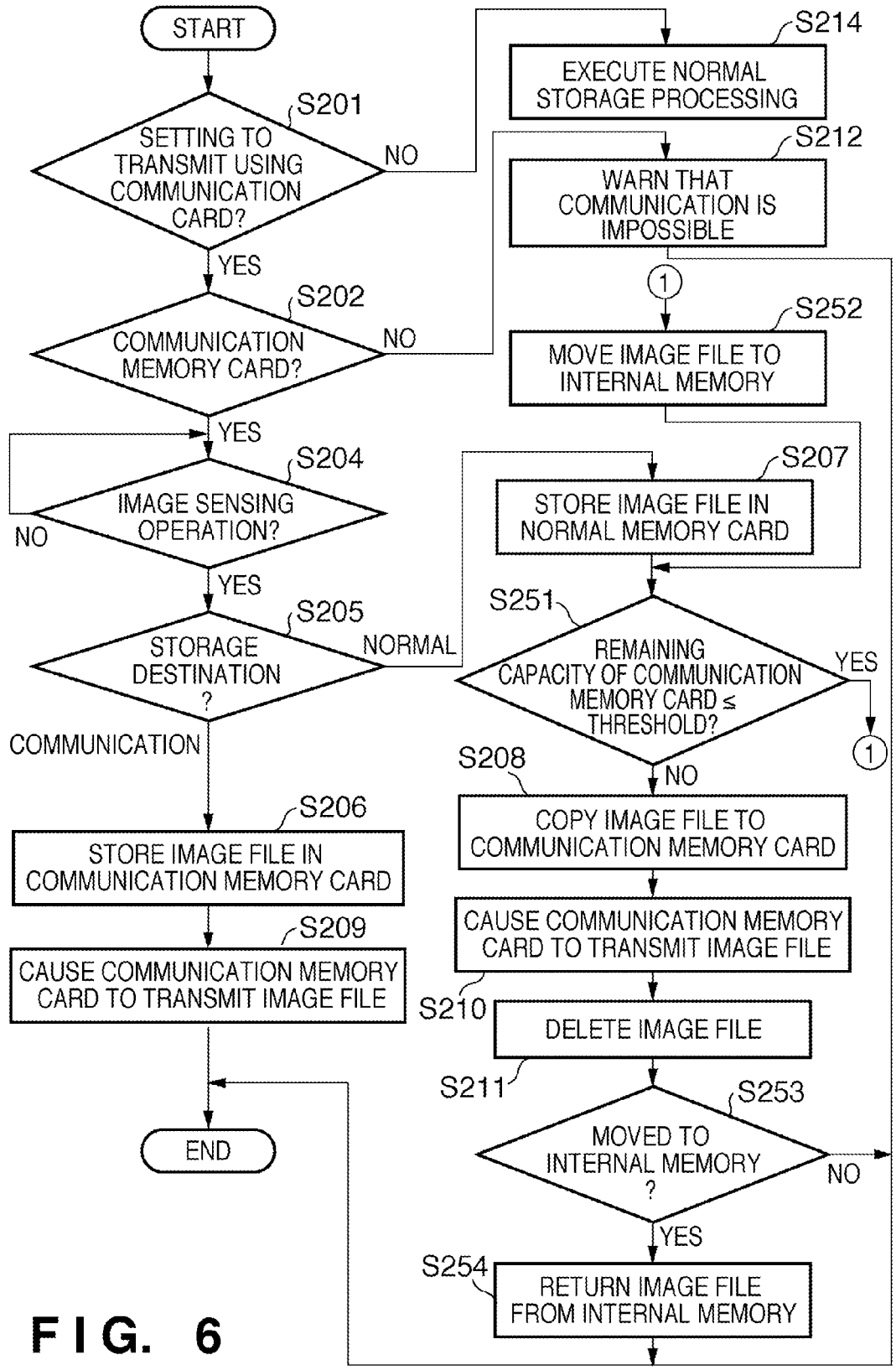
FIG. 6 is a flowchart illustrating processing according to the second embodiment of the present invention.

The functions of the modules according to the embodiment have been described above. The procedure of processing to be executed by the camera 1 according to the embodiment will be explained next. FIG. 6 is a flowchart illustrating processing to be executed by the camera 1 according to the embodiment. Note that steps S209 and S210 are processes to be executed by the communication memory card, although they are illustrated in the single flowchart for the descriptive convenience.

Processes in steps S201, S202, S204 to S207, S209, S212, and S214 of FIG. 6 are the same as those in steps S101, S102, S104 to S107, S109, S112, and S114 of FIG. 4. Note that if it is determined in step S205 that the storage destination is the communication memory card, the camera 1 may determine the remaining capacity of the communication memory card, and warn the user if the remaining capacity is equal to or smaller than the threshold.

Processing after an image file is stored in the normal memory card in step S207 will be described next. In step S251, the camera 1 determines whether the remaining capacity of the communication memory card is equal to or smaller than the threshold. Upon determining that the remaining capacity is equal to or smaller than the threshold, the process advances to step S252. Upon determining that the remaining capacity is not equal to or smaller than the threshold, the process advances to step S208.

A case in which it is determined in step S251 that the remaining capacity is not equal to or smaller than the threshold will be described first. Processes in steps S208, S210, and S211 are the same as those in steps S108, S110, S111 of FIG. 4.

In step S253, the camera 1 determines whether copy processing to the internal memory to be described later has been executed. In this case, copy to the internal memory has not been executed, and the processing ends.

A case in which it is determined in step S251 that the remaining capacity is equal to or smaller than the threshold will be described next. In this case, an image file already stored in the communication memory card is moved to the free area of the internal memory (S252). Note that "move" indicates copying an image file to the storage area of the moving destination and deleting the image file from the moving source. With this processing, a free area is temporarily generated in the communication memory card. This processing is repeated until a sufficient storage capacity is ensured in the communication memory card.

If it is determined that the remaining capacity of the communication memory card is not equal to or smaller than the threshold, the camera 1 advances the process to step S208. Processes in steps S208, S210, and S211 are the same as those in FIG. 4.

The camera 1 determines whether the image file has been moved from the communication memory card to the internal memory in step S252 (S253). Upon determining that the image file has been moved (YES in step S253), the moved image file is returned from the internal memory to the communication memory card (S254). More specifically, the image file is copied to the communication memory card, and the image file in the internal memory is deleted.

When transmitting a plurality of image files, an image file may be returned from the internal memory to the communication memory card every time one image file has been transmitted. If it is determined that the image file has not been moved (NO in step S253), the processing ends.

If the power switch has turned off during image file movement in step S252 or S254, the processing continues until the image file is moved from the internal memory to the communication memory card.

If the battery cover is opened during image file movement in step S252 or S254, the processing continues until the image file is moved from the internal memory to the communication memory card.

Note that the data amount of a file that moves between the communication memory card and the internal memory depends on the threshold of the remaining capacity of the communication memory card. For example, if setting has been done to copy an image file to the memory card 31 every time an image is captured, the data amount of one image file is used as the threshold. If setting has been done to copy image files to the memory card 31 after a plurality of images are captured, the total capacity of the image files to be transmitted is used as the threshold. If the internal memory has no free area corresponding to the total capacity of the image files to be transmitted, the camera 1 can repeatedly move the data amount of one image file. This enables transmission even if the remaining capacity of the internal memory is smaller than the total capacity of image files to be transmitted.

If capturing is performed during image file movement, file movement is interrupted while giving priority to capturing. This enables capturing without missing the shutter chance.

As described above, in the second embodiment, use of the internal memory makes it possible to transmit an image file stored in the normal memory card to the external apparatus even when the remaining capacity of the communication memory card is small. Note that the user can transmit an image file only by instructing the camera to perform image sensing because the process from step S205 is automatically executed, as in the first embodiment.

Note that in the above description, the internal memory is used as the moving destination. However, if the normal memory card has a free area, it may be used as the image file moving destination.

An example in which the present invention is applied to a digital camera has been described above. However, the present invention is also applicable to any other electronic device capable of creating data and storing it in a storage medium having a wireless communication function independently of the remaining capacity of the storage medium.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-022961, filed Feb. 3, 2009, which is hereby incorporated by reference herein in its entirety.

What is claimed is:

1. An electronic device that is accessible to a first storage medium that has no communication function and a second storage medium that has a communication function and is detachable from the device, comprising:
   an input unit configured to input image data;
   a designation unit configured to designate, in response to a user operation, at least one of the first storage medium and the second storage medium as a storage medium serving as a storage destination of the image data input by the input unit; and
   a control unit configured to store the image data in the first storage medium and in the second storage medium if the first storage medium is designated as the storage destination of the image data and the second storage medium is not designated, in order to transmit the image data to an external apparatus by the communication function of the second storage medium.

2. The device according to claim 1, further comprising a notification unit configured to notify a warning if the first storage medium is designated as the storage destination of the image data, and a storage capacity of the second storage medium is less than a data amount of the image data.

3. The device according to claim 1, wherein the control unit moves data already stored in the second storage medium to a storage medium incorporated in the electronic device if the first storage medium is designated as the storage destination of the image data, and a storage capacity of the second storage medium is less than a data amount of the image data.

4. The device according to claim 3, wherein data stored in the second storage medium are moved to one of the first storage medium and the storage medium incorporated in the electronic device as much as a data amount of all image data to be transmitted from the first storage medium to the external apparatus.

5. The device according to claim 3, wherein data stored in the second storage medium are moved to one of the first storage medium and the storage medium incorporated in the electronic device as much as a capacity of one image data to be transmitted from the first storage medium to the external apparatus.

6. The device according to claim 3, wherein the control unit controls to return, to the second storage medium, all data moved from the second storage medium to one of the first storage medium and the storage medium incorporated in the electronic device after the image data copied to the second storage medium has been transmitted to the external apparatus.

7. The device according to claim 3, wherein the control unit controls to return, to the second storage medium, one data moved from the second storage medium to one of the first storage medium and the storage medium incorporated in the electronic device after the image data copied to the second storage medium has been transmitted to the external apparatus.

8. The device according to claim 3, further comprising a capturing unit configured to photoelectrically convert an object image to generate the image data,
   wherein if the capturing unit executes capturing during movement of the data stored in the second storage medium, the control unit controls to interrupt movement of the data.

9. The device according to claim 1, wherein the control unit moves data already stored in the second storage medium to the first storage medium if the first storage medium is designated as the storage destination of the image data, and a storage capacity of the second storage medium is less than a data amount of the image data.

10. The device according to claim 9, wherein the control unit controls to return, to the second storage medium, the data moved from the second storage medium to the first storage medium after the image data copied to the second storage medium has been transmitted to the external apparatus.

11. A method of controlling an electronic device that is accessible to a first storage medium that has no communication function and a second storage medium that has a communication function and is detachable from the device, comprising the steps of:
   inputting image data;
   designating, in response to a user operation, at least one of the first storage medium and the second storage medium as a storage medium serving as a storage destination of the image data input in the inputting step; and
   storing the image data in the first storage medium and in the second storage medium if the first storage medium is designated as the storage destination of the image data and the second storage medium is not designated, in order to transmit the image data to an external apparatus by the communication function of the second storage medium.

12. A non-transitory computer readable storage medium on which is stored computer executable code of a computer program that causes a computer in an electronic device to execute the control method according to claim 11.

* * * * *